(No Model.)

H. W. VAUGHAN.
MACHINE FOR APPLYING COLORING MATTER TO FIBROUS MATERIAL.

No. 273,198. Patented Feb. 27, 1883.

WITNESSES.
W. H. Thurston
Edwn Salisbury Jones

INVENTOR.
H. W. Vaughan

N. PETERS, Photo-Lithographer, Washington, D. C.

UNITED STATES PATENT OFFICE.

HENRY W. VAUGHAN, OF PROVIDENCE, R. I., ASSIGNOR TO HOWARD RICHMOND AND JOHN W. SLATER, BOTH OF SAME PLACE.

MACHINE FOR APPLYING COLORING-MATTER TO FIBROUS MATERIAL.

SPECIFICATION forming part of Letters Patent No. 273,198, dated February 27, 1883.

Application filed November 8, 1882. (No model.)

*To all whom it may concern:*

Be it known that I, HENRY W. VAUGHAN, of the city and county of Providence, and State of Rhode Island, have invented a new and Improved Machine for Applying Coloring-Matter to Fibrous Material; and I do hereby declare that the following specification, taken in connection with the accompanying drawings, forming a part of the same, is a full, clear, and exact description thereof.

In Letters Patent of the United States issued to me December 30, 1879, and numbered 223,019, will be found described an improvement in methods of coloring fibrous material, which consists, generally, in mechanically incorporating a color-charged vehicle in the form of a powder with cotton, wool, and other fibrous material before the same is manufactured into yarn.

My present invention relates to mechanism which enables the said coloring process practically and inexpensively to be practiced; and it consists in a machine for applying a color-charged vehicle in the form of a powder to fibrous material, in such a manner that the coloring agent shall be uniformly distributed throughout said material. The machine, as a whole, consists, generally, of a frame in and upon which the various parts are mounted; a fan-blower or other air-blast-producing device; a hopper for holding and mechanism for introducing the color-vehicle into the current of air generated by the blower; a hollow cylinder having a surface of wire mesh, or a bed constructed to support the material to be colored, and to allow of a free passage of air under pressure through the same; rolls for feeding, guiding, and holding the material; an endless perforated apron, or equivalent device, for supporting and guiding the material during a portion of its passage through the machine, and rolls for compressing and rubbing the color-charged fibrous material to insure a thorough distribution of the coloring agent throughout the same.

Figure 1:
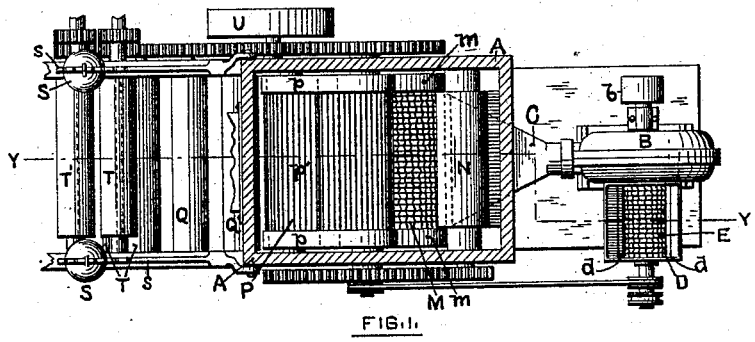
Figure 2:
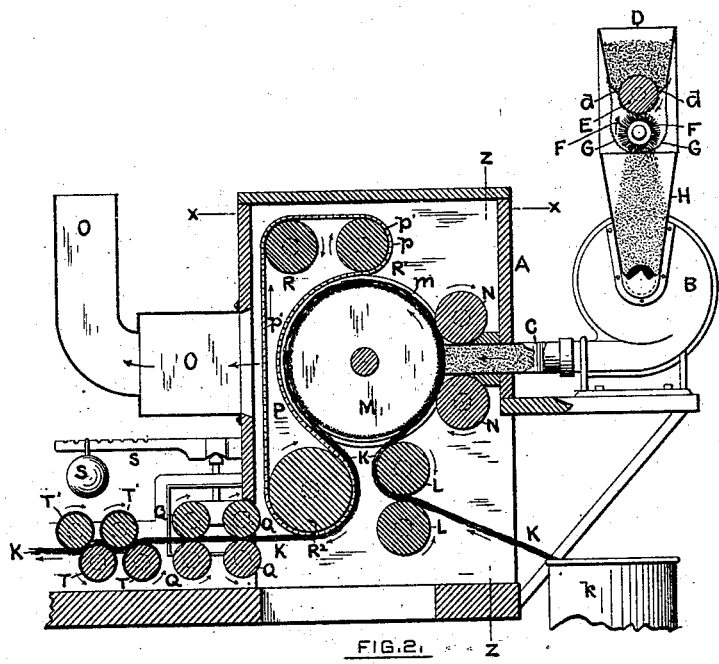
Figure 3:
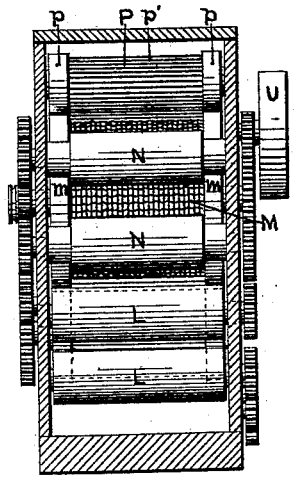

Referring to the drawings, Figure 1 represents a plan of a machine embodying my invention, a portion of the same being shown in horizontal section on line X X. Fig. 2 represents a vertical longitudinal section of the machine on line Y Y. Fig. 3 shows a vertical transverse section of the same on line Z Z.

A is the frame of the machine, upon which a fan-blower, B, or other air-blast-producing device, is mounted. This blower is driven through a pulley, $b$, by any convenient power, and is supplied with a discharge-funnel, C, which enters the machine, as shown in Figs. 1 and 2. The color-charged vehicle, having been suitably prepared in the form of a dry powder, is placed in a mass in a hopper, D, at the lower end of which a revolving cylinder, E, is arranged. The surface of this cylinder is covered with wire mesh, or is indented, and revolves in contact with two doctor-plates, $d$ $d$, which serve to prevent the color-vehicle from passing out of the hopper, except in the spaces between the meshes of the wire, or in the indentations in the surface of the cylinder. The holding capacity of the cells or recesses upon the surface of the cylinder E and the rate at which the cylinder is revolved determine the quantity of color-charged powder that shall be discharged in a given time from the receptacle or hopper containing the powder. Immediately below the cylinder E a brush, F, is arranged, which revolves in contact with said cylinder, and discharges the color-vehicle brought from the hopper upon a sieve, G. This brush also revolves in contact with the sieve G, and thereby forces the color-vehicle through said sieve into a chute or conveyer, H, secured to the side of the blower B, and opening into the same. Having entered the blower, the color-vehicle is taken up by the current of air generated by the power, and is discharged into the machine through the funnel C, as shown in Fig. 2.

The cotton, wool, or other fibrous material to be colored, in a fleecy state, and preferably in the form of a flat sliver or sheet, K, is received into the machine from any convenient source, as a can, $k$, by two rolls, L L, which act to guide the sliver, and may also act to feed it. From between these rolls the material passes upward onto the surface of a revolving cylinder, M, which surface is of wire mesh, secured to circular heads $m$ $m$, although the surface of the cylinder may be of any preferred construction which will afford a support for the material, and also allow of a free passage of air under pressure. Immediately in front of the cylinder M, and closely adjacent to its meshed surface, two revolving rolls, N N, are arranged, which fit between the cylinder-heads, as shown in Figs. 1 and 2, and gently press the sliver upon the perforated surface of the cylinder. The funnel C of the blower B enters the machine between the rolls N N, and extends into close proximity with the traveling sliver K of fibrous material. The color-vehicle, therefore, is uniformly discharged by the air-blast directly upon and into the material as it passes before the mouth of the funnel. After passing through the sliver, the air, having deposited the coloring-vehicle which it conveyed, escapes through an exhaust-duct, O, Fig. 2, which is hinged or otherwise secured to the frame at the rear of the machine.

The fibrous material treated as thus far described will be found to be colored, and may be removed from the machine by delivery-rolls, or equivalent means, conveniently located for the purpose. I prefer, however, in order to obtain the best results possible, to subject the sliver to further treatment for the following reasons: First, the air-blast, after passing through the sliver as above described, may still carry a small amount of color-vehicle, which, unless utilized by being deposited upon the sliver, will be discharged into the duct O; secondly, it may be desirable, and in some cases may be found necessary, as when a thick sliver is worked or a deep color is desired, that sufficient force be given to the air-blast to carry some of the color-vehicle through the sliver, in the first instance, to be propelled upon, and into the material from its back side, thereby securing a more even distribution of the coloring agent throughout the fiber; thirdly, I prefer, also, to employ compressing-rolls and rubbing-rolls, in order to secure the most thorough distribution of the color-vehicle through and its incorporation with the material; I have arranged the machine, therefore, so that the sliver shall pass partially around the cylinder M and through the path of the air-blast a second time, and thence to the compressing and the rubbing rolls above mentioned.

During the passage of the sliver through the air-blast a second time the pressure of the blast tends to force the sliver away from the cylinder, and thereby strain and elongate the material. To prevent this I provide a support for the sliver during such time, which support is in the form of an endless apron, P, constructed so as to allow of a free passage of air through it. This apron also acts to guide the sliver from the cylinder to the compressing-rolls Q Q, as will be seen by an examination of Fig. 2. The apron P is composed of two flexible belts, p p, between which are arranged transverse wires p'. The belts p p pass over rollers R R' R², the latter of which is positively driven, and said straps are also in contact, during their revolution, with the cylinder-heads m m, thereby bringing the wires p' into close proximity with the surface of the cylinder M. Between the rolls R' R², therefore, the sliver is supported by the apron P against the pressure of the air-blast, which forces any of the color-vehicle which it may still carry into the sliver from the back side thereof. Beyond the roller R² the sliver passes to the rolls Q Q, which, by means of weights S, hung upon levers s, or by equivalent means, compress the sliver and establish a more intimate relation between its fibers and the coloring-vehicle with which it is charged. From the rolls Q Q, I prefer to pass the sliver between revolving rolls T T'—more or less in number—for the purpose, mainly, of rubbing the material, in order still more thoroughly to incorporate the color-vehicle with the material and secure the most even distribution possible. Preferably each pair of rolls after the first has a slight draft, so as slightly to elongate and straighten the fiber. The rolls T simply revolve in their bearings at a proper speed; but the rolls T' not only have revolution, but by proper and well-known means (not shown in the drawings) are given a horizontal reciprocating motion upon the rolls T, so as to rub the material as it passes between the rolls. If desired, the rolls T may also be reciprocated.

The cylinder M and the rolls L, N, R², Q, T, and T' are driven at the proper speeds by gearing, (shown in Figs. 1 and 3,) motion to which is given by a pulley, U.

As shown in the drawings, and as hereinbefore described, the color-charged vehicle is delivered from the hopper D directly into the fan-blower B; but, if desired, the color-vehicle may be introduced into the current generated by the air-blast-producing device at any time before the current comes in contact with the fibrous material.

While all the features of the machine above described are useful for accomplishing the application of the color-charged powder to the fibrous material and completely mechanically incorporating such powder therewith, it is obvious that the important characteristic of the apparatus is, that the fibrous material is made to travel while supported upon a perforated bed, so that the blast of air carrying the color-charged powder can pass through the material without the blast itself being materially arrested by the supporting-bed, while at the same time the color-powder will be mainly arrested by the material. Instead of a revolving perforated cylinder, as shown, as a supporting-bed for the sliver or web of material, a flat-faced stationary perforated bed may be substituted, and the sliver may be made by means familiar to workers of textiles to travel over such bed across the path of the color-charged blast.

Although I have shown and described the sliver or sheet of fibrous material as being delivered to the machine from a can, k, the machine is adapted to be and preferably is located between the carding-machine and the railway-heads, or between other sets of machinery, in order that the material may be charged with the color-vehicle without the necessity of extra handling for such purpose.

What I claim, and desire to secure by Letters Patent, is—

1. The combination, substantially as before set forth, of a receptacle for color-charged powder in mass, suitable mechanism, as described, for producing a blast of air, and arranged to carry such powder against a passing sliver or sheet of fibrous material to be colored thereby, and a bed for supporting the sliver, constructed as described, to admit of a free passage of air through it, as and for the purposes specified.

2. The combination, substantially as before set forth, of suitable mechanism, as described, for producing a blast of air, a perforated or open-work revolving bed for supporting the sliver or sheet of fibrous material to be colored, and a perforated or open-work apron concentric with said bed, as and for the purposes specified.

3. The combination, substantially as before set forth, of a receptacle for a mass of color-charged powder, suitable mechanism, as described, for producing a blast of air, and arranged, as described, to carry said powder against a traveling sliver or sheet of fibrous material to be colored thereby, a perforated or open-work bed to support such material, and pressure or rubbing rollers for condensing the sliver or sheet and incorporating the applied powder more intimately with the fiber, substantially as described.

4. The combination, substantially as before set forth, of a receptacle for color-charged powder in mass, suitable mechanism, as described, for producing a blast of air, and arranged to carry such powder against a passing sliver or sheet of fibrous material to be colored thereby, devices, substantially as described, for regulating the measured discharge of said powder from said receptacle into the air-current, and a bed for supporting the sliver, constructed as described, to admit of a free passage of air through it, as and for the purposes specified.

H. W. VAUGHAN.

Witnesses:
W. H. THURSTON,
I. KNIGHT.